US011205416B2

(12) United States Patent
Washio et al.

(10) Patent No.: US 11,205,416 B2
(45) Date of Patent: Dec. 21, 2021

(54) NON-TRANSITORY COMPUTER-READABLE STORAGE MEDIUM FOR STORING UTTERANCE DETECTION PROGRAM, UTTERANCE DETECTION METHOD, AND UTTERANCE DETECTION APPARATUS

(71) Applicant: FUJITSU LIMITED, Kawasaki (JP)

(72) Inventors: Nobuyuki Washio, Akashi (JP); Chisato Shioda, Sagamihara (JP); Masanao Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 16/668,009

(22) Filed: Oct. 30, 2019

(65) Prior Publication Data
US 2020/0175960 A1 Jun. 4, 2020

(30) Foreign Application Priority Data

Dec. 4, 2018 (JP) .............................. JP2018-227331

(51) Int. Cl.
*G10L 15/00* (2013.01)
*G10L 21/0308* (2013.01)
*G10L 21/0216* (2013.01)
*G06F 40/58* (2020.01)

(52) U.S. Cl.
CPC ............ *G10L 15/005* (2013.01); *G06F 40/58* (2020.01); *G10L 21/0216* (2013.01); *G10L 21/0308* (2013.01)

(58) Field of Classification Search
CPC ..... G10L 15/005; G10L 21/0216; G06F 40/58
USPC ......................................................... 704/277
See application file for complete search history.

(56) References Cited

U.S. PATENT DOCUMENTS

2017/0092299 A1    3/2017  Matsuo
2019/0303443 A1*  10/2019  Furukawa ............. G06F 40/103

FOREIGN PATENT DOCUMENTS

| JP | 2011065044 A | * | 3/2011 | ............. G10L 11/00 |
| JP | 2011-227199 A | | 11/2011 | |
| JP | 2017-67862 A | | 4/2017 | |
| WO | WO-2020110228 A1 | * | 6/2020 | ......... G10L 21/0208 |

* cited by examiner

*Primary Examiner* — Susan I McFadden
(74) *Attorney, Agent, or Firm* — Fujitsu Patent Center

(57) ABSTRACT

An utterance detection apparatus includes a processor configured to: detect an utterance start based on a first sound pressure based on first audio data acquired from a first microphone and a second sound pressure based on second audio data acquired from a second microphone; suppress an utterance start direction sound pressure when the utterance start direction sound pressure, which is one of the first sound pressure and the second sound pressure being larger at a time point of detecting the utterance start, falls below a non-utterance start direction sound pressure, which is the other one of the first sound pressure and the second sound pressure being smaller at the time point of detecting the utterance start; and detect an utterance end based on the suppressed utterance start direction sound pressure.

15 Claims, 12 Drawing Sheets

NON-TRANSITORY COMPUTER-READABLE STORAGE MEDIUM FOR STORING UTTERANCE DETECTION PROGRAM, UTTERANCE DETECTION METHOD, AND UTTERANCE DETECTION APPARATUS

CROSS-REFERENCE TO RELATED APPLICATION

This application is based upon and claims the benefit of priority of the prior Japanese Patent Application No. 2018-227331, filed on Dec. 4, 2018, the entire contents of which are incorporated herein by reference.

FIELD

The embodiments discussed herein are related to a non-transitory computer-readable storage medium for storing an utterance detection program, an utterance detection method, and an utterance detection apparatus.

BACKGROUND

When a speech translation system is used in a medical site and the like, the system is desirably voice-operable because the hands of an operator may be full and hardly available for manipulation of buttons. A technique is therefore used in this situation, which is designed to acquire speeches of operators by using microphones, to automatically detect utterance segments, and to perform speech recognition and translation on audio data in each utterance segment.

There is proposed a technique as the related art, which is designed to improve quality of a sound in a direction of a sound source by suppressing sounds in directions other than the direction of the sound source (see Patent Literature 1, for example).

There is proposed another technique as the related art, which is designed to adjust an amount of suppression of noise such that the amount of suppression during a specific period, which starts from a position based on a terminal end of an utterance segment and is a period shorter than a period spanning from the terminal end of the utterance segment to a starting end of the next utterance segment, becomes greater than in other segments (see Patent Literature 2, for example).

Examples of the related art include Japanese Laid-open Patent Publication No. 2011-227199, and Japanese Laid-open Patent Publication No. 2017-67862.

SUMMARY

According to an aspect of the embodiments, an utterance detection apparatus includes: a memory; and a processor coupled to the memory, the processor being configured to detect an utterance start based on a first sound pressure based on first audio data acquired from a first microphone and a second sound pressure based on second audio data acquired from a second microphone, suppress an utterance start direction sound pressure when the utterance start direction sound pressure, which is one of the first sound pressure and the second sound pressure being larger at a time point of detecting the utterance start, falls below a non-utterance start direction sound pressure, which is the other one of the first sound pressure and the second sound pressure being smaller at the time point of detecting the utterance start, and detect an utterance end based on the suppressed utterance start direction sound pressure.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

If noise is generated in a direction different from a direction of an utterance in a case of detecting an utterance segment, a sound pressure is increased by the noise whereby a timing to detect an utterance end (termination of the utterance) may be delayed from an actual timing of the utterance end. For example, if a certain speaker starts speaking before another speaker finishes an utterance, the sound pressure is increased by the speech (noise) of the certain speaker and this increase may cause a delay in timing to detect the utterance end of the speaker who started the utterance earlier. The delay in timing to detect the utterance end leads to delays in speech recognition and output of a translation result, and makes a user wait as a consequence.

As one aspect, an object of present disclosure is to improve detection accuracy of an utterance end.

Figure 1:
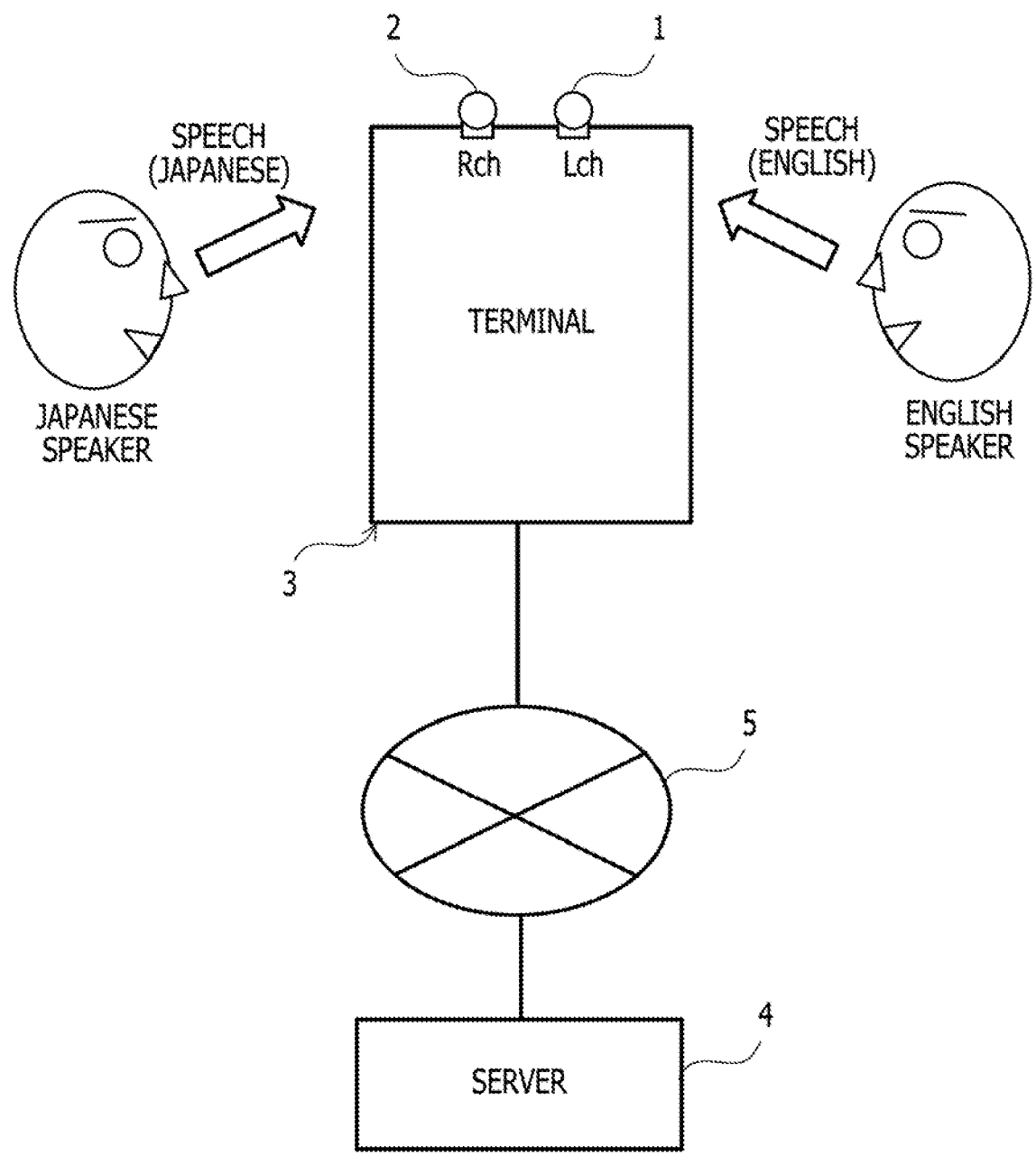
FIG. 1 is a diagram illustrating an example of a configuration of an utterance detection system.

An embodiment will be described below with reference to the accompanying drawings. FIG. 1 is a diagram illustrating an example of a configuration of an utterance detection system. In FIG. 1, there is installed a terminal 3 to which a first microphone 1 (Lch) having directionality and a second microphone 2 (Rch) having directionality are coupled. The terminal 3 is capable of communicating with a server 4 through a network 5. A speaker of the English language (an English speaker) is present at a position in a direction corresponding to the directionality of the first microphone 1 while a speaker of the Japanese language (a Japanese speaker) is present at a position in a direction corresponding to the directionality of the second microphone 2.

In the following, a sound pressure based on audio data acquired from the first microphone 1 (Lch) will be referred to as an Lch sound pressure and a sound pressure based on audio data acquired from the second microphone 2 (Rch) will be referred to as an Rch sound pressure. In the example illustrated in FIG. 1, the terminal 3 detects an utterance start based on the Lch sound pressure and the Rch sound pressure. Based on a sound pressure difference between the Lch sound pressure and the Rch sound pressure, the terminal 3 determines whether a sound source is the Japanese speaker or the English speaker. For example, the terminal 3 determines that the English speaker is speaking when the Lch sound pressure is larger than the Rch sound pressure and determines that the Japanese speaker is speaking when the Rch sound pressure is larger than the Lch sound pressure.

The terminal 3 or the server 4 capable of communicating with the terminal 3 executes speech recognition and translation based on the language of the determined speaker.

Figure 2:
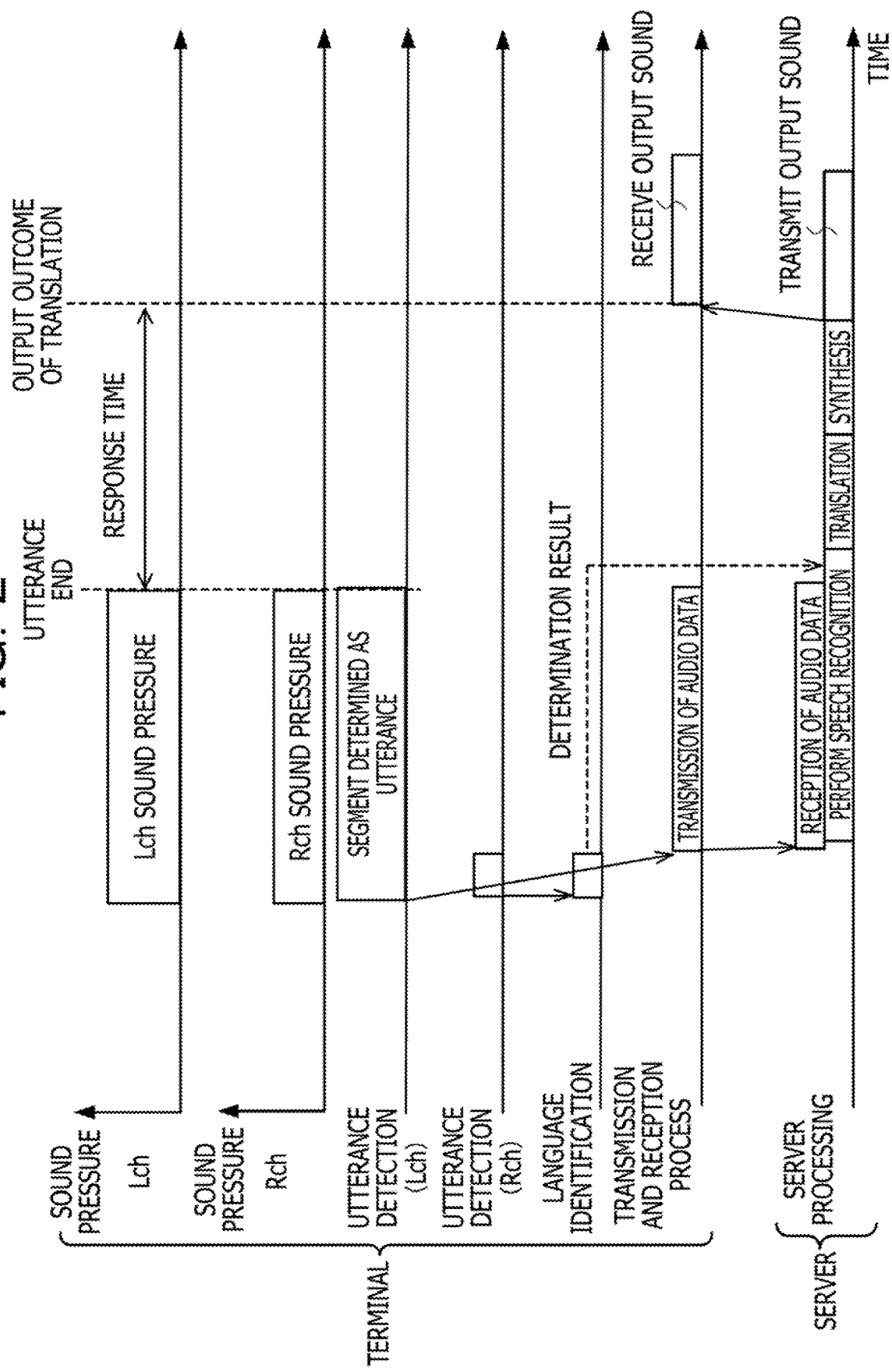
FIG. 2 is a diagram illustrating an example of operations from detection of an utterance to an output of a translation result.

FIG. 2 is a diagram illustrating an example of operations from detection of an utterance to an output of a translation result. The operations illustrated in FIG. 2 represent an operation example in a case where the English speaker present on the Lch side starts the utterance in FIG. 1.

FIG. 2 illustrates the Lch sound pressure based on the audio data acquired from the Lch side and the Rch sound pressure based on the audio data acquired from the Rch side. When the English speaker starts the utterance in the example illustrated in FIG. 1, a sound is inputted not only to the Lch but also to the Rch in a detouring manner. As a consequence, the terminal 3 is likely to detect the utterance from both of the Lch side and the Rch side.

The terminal 3 calculates the sound pressure difference between the Lch sound pressure and the Rch sound pressure, and determines that the sound represents the utterance of the English speaker present on the Lch side when the Lch sound pressure is larger than the Rch sound pressure, for example. In this case, the terminal 3 continues utterance detection from the audio data on the Lch that has directionality in the direction of the sound source (the English speaker) while terminates the utterance detection from the audio data on the Rch that does not have directionality in the direction of the sound source. The terminal 3 transmits the audio data acquired from the Lch to the server 4 together with a determination result indicating that English is the language spoken therein.

The server 4 receives the audio data and executes English speech recognition based on the determination result. As illustrated in FIG. 2, the server 4 may execute the reception of the audio data and the speech recognition in parallel. After the execution of the speech recognition, the server 4 performs translation and a speech synthesis, and outputs an outcome of translation in the form of sound to the terminal 3.

In the example illustrated in FIG. 2, response time from termination of an utterance segment (an utterance end) to the output of the outcome of translation corresponds to a period of time to make a user wait for the outcome of translation. In this regard, it is desirable to shorten this response time.

Figure 3:
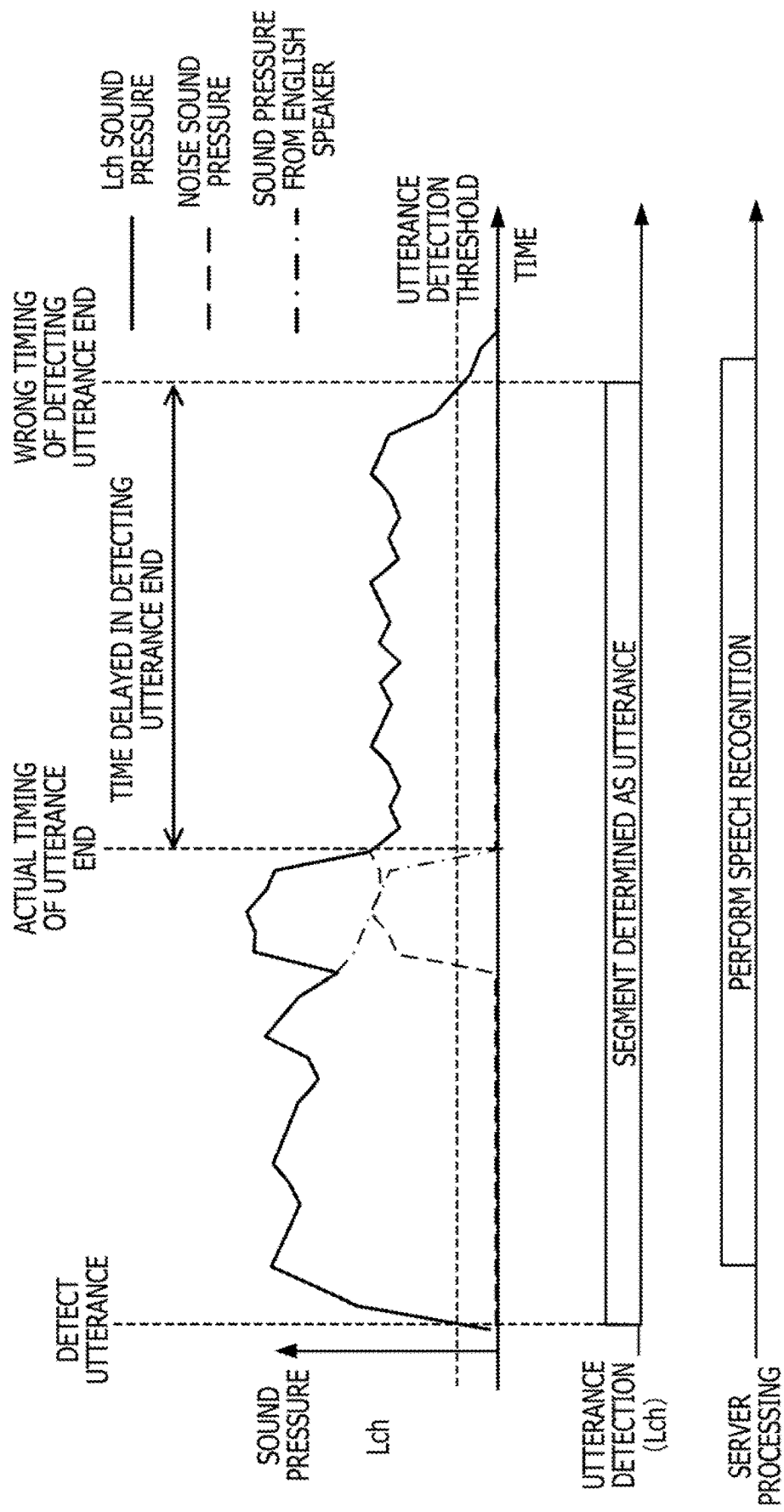
FIG. 3 is a diagram illustrating a first example of an error in detecting an utterance end.

FIG. 3 is a diagram illustrating a first example of an error in detecting the utterance end. FIG. 3 illustrates the Lch sound pressure based on the audio data acquired from the Lch side in a case where the English speaker starts the utterance and the Japanese speaker starts speaking before the utterance of the English speaker is finished. The speech of the Japanese speaker represents an example of noise.

Let us assume that the terminal 3 detects the utterance at a timing immediately after the English speaker starts speaking in the example illustrated in FIG. 3. It is also assumed that, as the Japanese speaker starts speaking before the English speaker finishes the utterance, the sound pressure does not fall below an utterance detection threshold at a timing when the English speaker finishes the utterance and the terminal 3 fails to detect the utterance end at an actual end of the utterance. Hence, the terminal 3 detects the utterance end later than the finish of the utterance by the English speaker in the case where the Lch sound pressure eventually falls below the utterance detection threshold. In other words, in the case illustrated in FIG. 3, the terminal 3 detects the utterance end at the wrong timing that is later than the actual timing of the utterance end.

Figure 4:
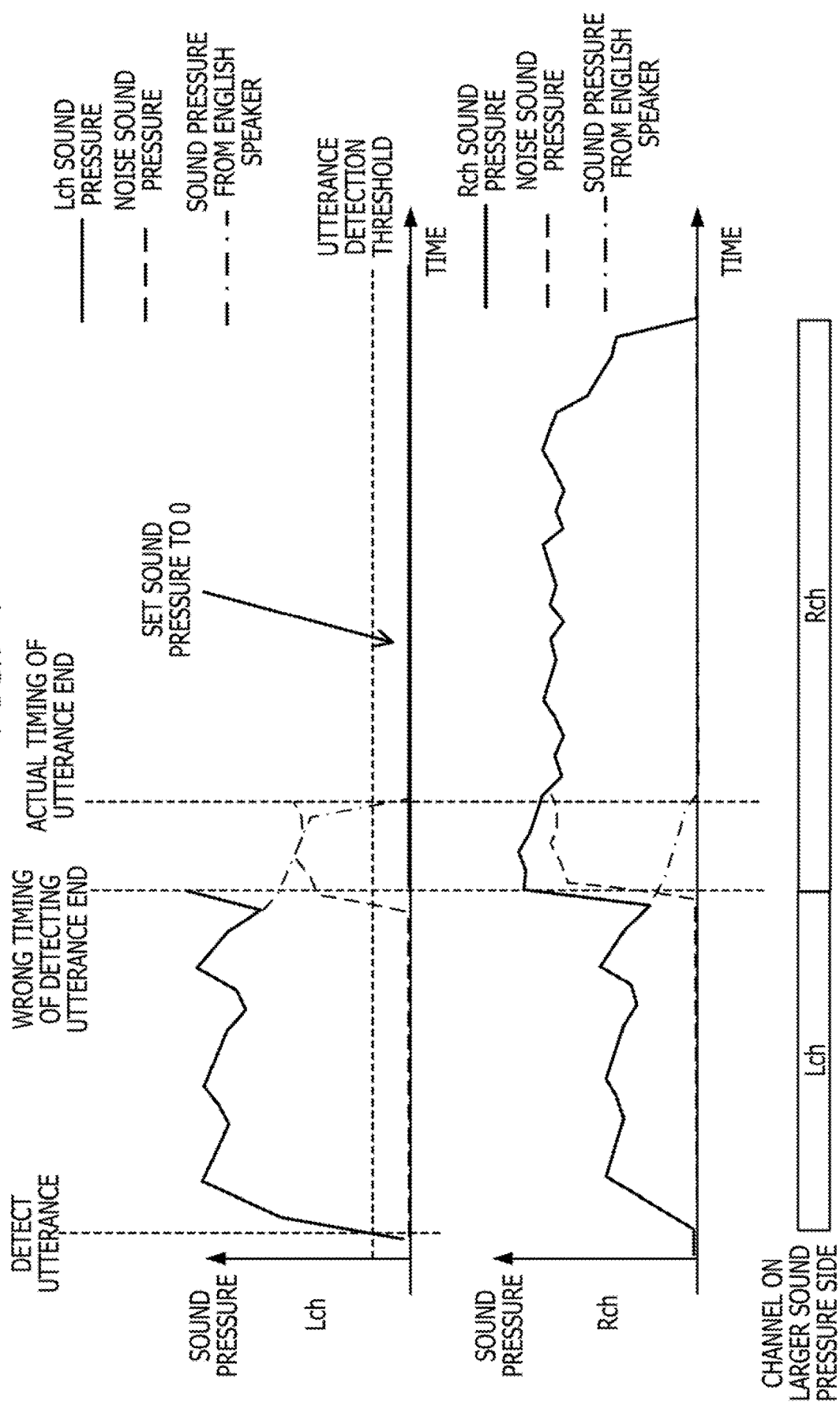
FIG. 4 is a diagram illustrating a second example of the error in detecting an utterance end.

FIG. 4 is a diagram illustrating a second example of the error in detecting the utterance end. FIG. 4 illustrates the Lch sound pressure and the Rch sound pressure in the case where the English speaker starts the utterance and the Japanese speaker starts speaking before the utterance of the English speaker is finished as with the example depicted in FIG. 3.

In the example illustrated in FIG. 4, the Lch sound pressure is rejected (set to 0) when the Rch sound pressure exceeds the Lch sound pressure. For this reason, the Lch sound pressure falls below the utterance detection threshold at a time point when the Rch sound pressure exceeds the Lch sound pressure, and the terminal 3 detects the utterance end accordingly. In this case, the terminal 3 detects the utterance end at the timing earlier than the actual timing of the utterance end.

Figure 5:
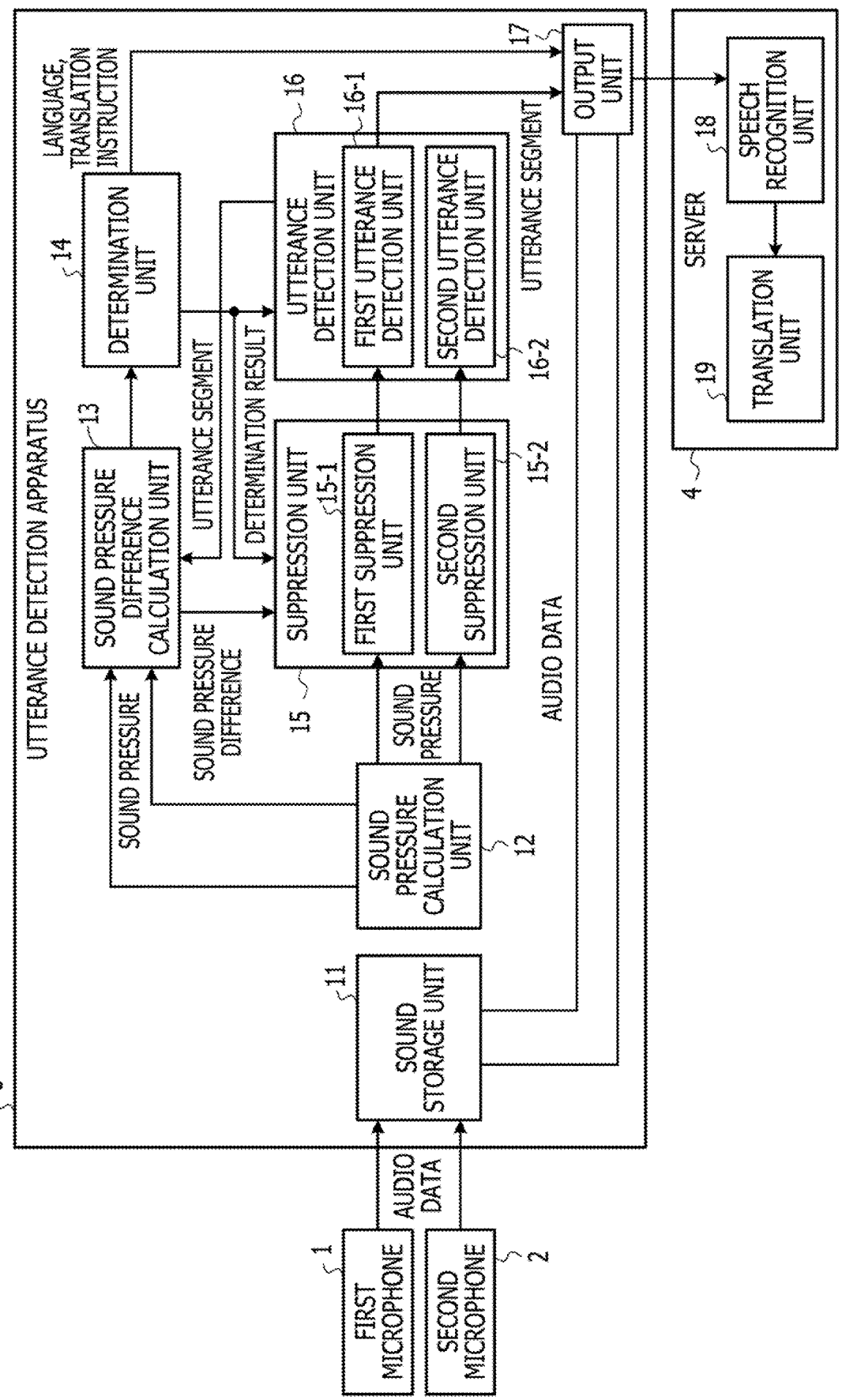
FIG. 5 is a functional block diagram illustrating an example of a system according to an embodiment.

FIG. 5 is a functional block diagram illustrating an example of a system of this embodiment. The system of this embodiment includes the first microphone 1, the second microphone 2, the server 4, and an utterance detection apparatus 6.

The utterance detection apparatus 6 includes a sound storage unit 11, a sound pressure calculation unit 12, a sound pressure difference calculation unit 13, a determination unit 14, a suppression unit 15, an utterance detection unit 16, and an output unit 17. The utterance detection apparatus 6 is a smartphone, a tablet terminal, or the like, for example. The utterance detection apparatus 6 represents an example of a computer.

The server 4 includes a speech recognition unit 18 and a translation unit 19. The speech recognition unit 18 and the translation unit 19 may be incorporated in the utterance detection apparatus 6.

Each of the first microphone 1 and the second microphone 2 has directionality. The first microphone 1 and the second microphone 2 are installed in such a way as to detect sounds in different directions from each other. The utterance detection apparatus 6 corresponds to the terminal 3 in FIG. 1, and the English speaker is present in the direction corresponding to the directionality of the first microphone 1 while the Japanese speaker is present in the direction corresponding to the directionality of the second microphone 2.

The sound storage unit 11 stores first audio data acquired from the first microphone 1 and second audio data acquired from the second microphone 2. The sound storage unit 11 sends the first audio data and the second audio data to the output unit 17.

The sound pressure calculation unit 12 calculates a sound pressure (the Lch sound pressure) based on the first audio data and a sound pressure (the Rch sound pressure) based on the second audio data, and outputs the calculated sound pressures to the sound pressure difference calculation unit 13 and to the suppression unit 15. The sound pressure calculation unit 13 outputs the Lch sound pressure to a first suppression unit 15-1 and outputs the Rch sound pressure to a second suppression unit 15-2, for example.

The sound pressure difference calculation unit 13 calculates a sound pressure difference between the Lch sound pressure and the Rch sound pressure acquired from the sound pressure calculation unit 12. The Lch sound pressure represents an example of a first sound pressure and the Rch sound pressure represents an example of a second sound pressure. When the Lch sound pressure is denoted by $P_L$ and the Rch sound pressure is denoted by $P_R$, the sound pressure difference D is expressed by the following formulae, for example:

$$D=P_L-P_R \quad (1)$$

(before determination of a direction of an utterance);

$$D=P_L-P_R \quad (2)$$

(when the Lch side is determined as the direction of the utterance); and $$D=P_R-P_R \quad (3)$$

(when the Rch side is determined as the direction of the utterance).

Note that the sound pressure difference is 0 when $P_L=PR_R$ holds true.

The determination unit 14 determines the direction of the sound source of each of the first audio data and the second audio data based on the sound pressure difference between the Lch sound pressure and the Rch sound pressure at a time point of detecting an utterance start. In the meantime, the determination unit 14 identifies a language based on the direction of the sound source, and outputs instructions to the server 4 through the output unit 17 so as to cause the server 4 to execute the speech recognition and the translation based on the identified language.

In the case of using the above-mentioned formula (1), for instance, the determination unit 14 determines that the direction corresponding to the directionality of the first microphone 1 (the direction where the English speaker is present in FIG. 1) is the direction of the sound source and the language is English if D>0 ($P_R<P_L$) holds true. On the other hand, the determination unit 14 determines that the direction corresponding to the directionality of the second microphone 2 (the direction where the Japanese speaker is present in FIG. 1) is the direction of the sound source and the language is Japanese if D<0 ($P_L<P_R$) holds true. Correlations between the directions of the sound source and the languages may be stored in advance and the determination unit 14 may identify the language based on the direction of the sound source and the relevant correlation. The determination unit 14 outputs the instruction, which is to cause the server 4 to execute the speech recognition and the translation based on the language identified by the language identification, to the server 4 through the output unit 17. When the determination result turns out to be Japanese, for example, the determination unit 14 issues the instruction to execute the speech recognition in Japanese and to execute the translation based on a language pair (a pair of languages indicating execution of translation from what language to what language) "from Japanese to English". An outcome of the translation language is determined to be in English because English is the language that corresponds to the microphone in the direction opposite to the direction of the sound source in this embodiment, and the translation is premised on a conversation between the speakers present in the directions of these microphones. If the translation is to be made for a specific language not on the premise of these speakers, then the determination unit 14 may be configured to store such a translation target language.

A sound pressure out of the Lch sound pressure and the Rch sound pressure which is larger at a time point of detecting the utterance start will be referred to as an utterance start direction sound pressure. In the case of using the above-mentioned formula (1), if the D>0 ($P_R<P_L$) holds true then the Lch sound pressure $P_L$ is the utterance start direction sound pressure while the Rch sound pressure $P_R$ is a non-utterance start direction sound pressure.

For example, when the direction corresponding to the directionality of the first microphone 1 is determined as the direction of the sound source in the example illustrated in FIG. 1, the determination unit 14 outputs English as the determination result of the language to be used in the speech recognition and the translation. For example, when the direction corresponding to the directionality of the second microphone 2 is the direction of the sound source in the example illustrated in FIG. 1, the determination unit 14 outputs Japanese as the determination result of the language to be used in the speech recognition and the translation.

The suppression unit 15 acquires the Lch sound pressure and the Rch sound pressure from the sound pressure calculation unit 12. The suppression unit 15-1 performs suppression processing on the Lch sound pressure. The suppression unit 15-2 performs suppression processing on the Rch sound pressure.

When the utterance start direction sound pressure which is one of the Lch sound pressure and the Rch sound pressure being larger at the time point of detecting the utterance start falls below the non-utterance start direction sound pressure which is one of the Lch sound pressure and the Rch sound pressure being smaller at the time point of detecting the utterance start, the suppression unit 15 suppresses the utterance start direction sound pressure. For example, the suppression unit 15 suppresses the utterance start direction sound pressure by subtracting a predetermined suppression amount β from the utterance start direction sound pressure, and outputs the value after the subtraction to the utterance detection unit 16. In the meantime, when the suppression unit 15 does not perform the suppression, the suppression unit 15 outputs the sound pressures acquired from the sound pressure calculation unit 12 directly to the utterance detection unit 16.

The utterance detection unit 16 detects the utterance start based on the Lch sound pressure that is based on the first audio data acquired from the first microphone 1 and on the Rch sound pressure that is based on the second audio data acquired from the second microphone 2, both of which are outputted from the sound pressure calculation unit 12. When the suppression unit 15 performs the suppression processing after the detection of the utterance start, the utterance detection unit 16 detects the utterance based on the suppressed sound pressure and sends the output unit 17 information indicating the utterance segment. A first utterance detection unit 16-1 detects the utterance regarding the Lch sound pressure. A second utterance detection unit 16-2 detects the utterance regarding the Rch sound pressure.

When the utterance detection unit 16 receives a determination result on the direction from the determination unit 14, the utterance detection unit 16 continues the utterance detection regarding the audio data from the microphone having the directionality in line with the direction of the sound source and suspends the utterance detection regarding the audio data from the microphone having the directionality not in line with the direction of the sound source. In the example illustrated in FIG. 1, when the sound source is determined to be the English speaker, the utterance detection unit 16 continues the utterance detection regarding the Lch sound pressure and suspends the utterance detection regarding the Rch sound pressure. Note that details of the processing performed by the utterance detection unit 16 will be described later.

After the reception of the determination result from the determination unit 14, the output unit 17 reads data from the sound storage unit 11, the data corresponding to a portion of the utterance segment received from the utterance detection unit 16 out of the audio data of the channel corresponding to the determination result, and outputs the read data to the speech recognition unit 18 together with the identification result of the language received from the determination unit 14. The output unit 17 outputs the language pair (the pair of languages indicating execution of translation from what language to what language) and the translation instruction, which are sent from the determination unit 14, further to the server 4.

The speech recognition unit 18 executes the speech recognition regarding the audio data of the utterance segment received from the output unit 17 by using the language indicated in the identification result of the language received from the output unit 17 likewise.

The translation unit 19 performs translation processing on a result of speech processing by the speech recognition unit 18. The translation unit 19 performs the translation processing according to the language pair transmitted from the output unit 17 based on the determination result of the language.

Figure 6:
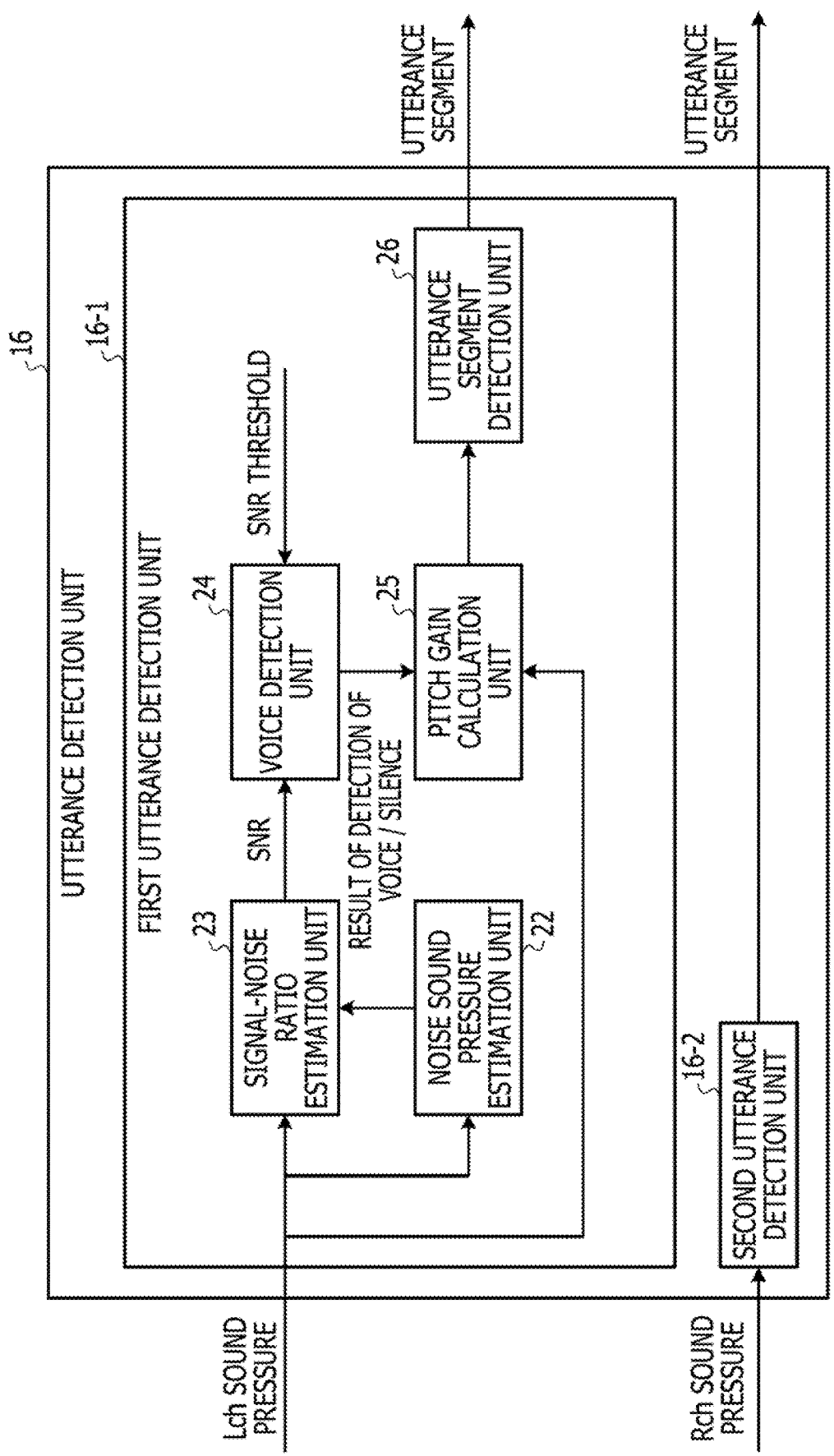
FIG. 6 is a diagram illustrating an example of a configuration of an utterance detection unit.

FIG. 6 is a diagram illustrating an example of a configuration of the utterance detection unit 16. While FIG. 6 illustrates a detailed configuration of the first utterance detection unit 16-1, the second utterance detection unit 16-2 is assumed to have the same configuration. The first utterance detection unit 16-1 includes a noise sound pressure estimation unit 22, a signal-noise ratio estimation unit 23, a voice detection unit 24, a pitch gain calculation unit 25, and an utterance segment detection unit 26. In the following, the signal-noise ratio may be referred to as SNR as appropriate.

The utterance detection unit 16 executes the utterance detection from the sound pressure received from the suppression unit 15. A frame length is set in a range from 10 msec to 20 msec, for example. The utterance detection unit 16 performs the processing while dividing the audio data into pieces each having the set frame length.

The noise sound pressure estimation unit 22 calculates an estimated noise component for each frame based on the acquired sound pressure. The signal-noise ratio estimation unit 23 calculates the SNR based on the sound pressure acquired from the suppression unit 15 and on a noise sound pressure inputted from the noise sound pressure estimation unit 22. The voice detection unit 24 compares the SNR inputted from the signal-noise ratio estimation unit 23 with a preset SNR threshold, and determines that the sound is present when the SNR is equal to or above the SNR threshold. The voice detection unit 24 outputs, to the pitch gain calculation unit 25, a determination result indicating whether the audio data corresponding to each frame includes a voice component (e.g., whether the audio data corresponding to each frame represents voice or silent).

The pitch gain calculation unit 25 calculates a pitch gain representing strength of sound periodicity for each frame included in a segment which is determined as voice, and outputs the pitch gain to the utterance segment detection unit 26.

The utterance segment detection unit 26 detects an utterance segment by comparing the pitch gain of each frame in the segment with a threshold for detecting the utterance segment. For example, the utterance segment detection unit 26 detects a timing when the pitch gain becomes equal to or above a first pitch gain threshold in a state of the continued non-utterance segment without any utterance of a speaker as a start timing of the utterance segment indicating a segment with an utterance of the speaker. The utterance segment detection unit 26 detects a timing when the pitch gain falls below a second pitch gain threshold lower than the first pitch gain threshold in the state of the continued utterance segment as an end timing of the utterance segment. In order to improve detection accuracy, the utterance segment detection unit 26 may detect the start timing on the condition that the state of exceeding the first pitch gain threshold continues for a predetermined number of frames, and may detect the end timing on the condition that the state of falling below the second pitch gain threshold continues for a predetermined number of frames. In this case, the start timing is determined as the frame in which the excess of the first pitch gain threshold begins.

The utterance segment detection unit 26 outputs utterance segment information thus detected. For example, when the utterance segment detection unit 26 detects the start timing of the utterance segment in a certain frame, the utterance segment detection unit 26 outputs the start timing indicating that the utterance start has been detected. When the utterance segment detection unit 26 detects the end timing of the utterance segment, the utterance segment detection unit 26 outputs the end timing of the utterance segment as the utterance segment information.

Figure 7:
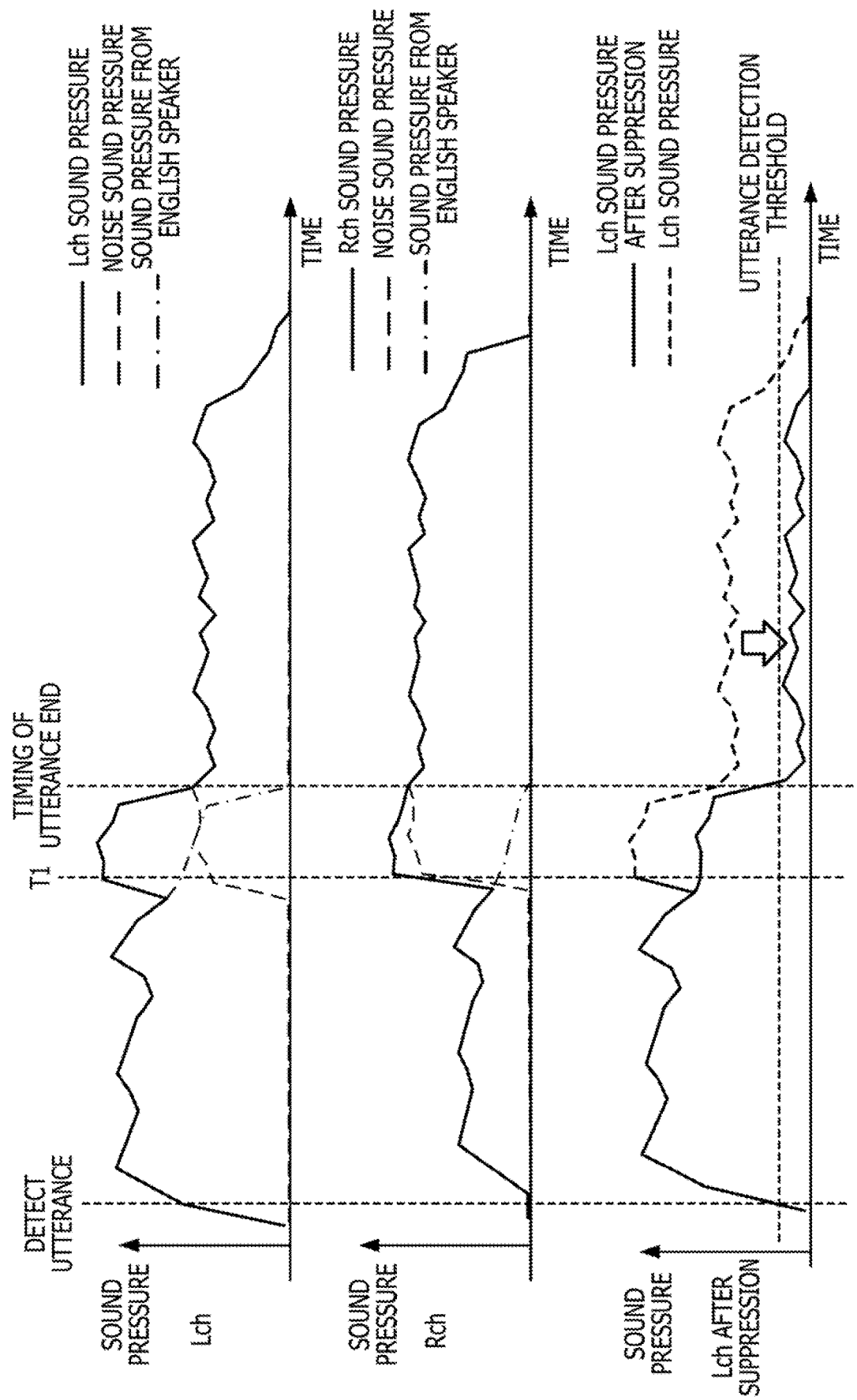
FIG. 7 illustrates graphs depicting an example of a result of suppression processing.

FIG. 7 illustrates graphs depicting an example of a result of the suppression processing. As with the examples illustrated in FIGS. 3 and 4, FIG. 7 illustrates the Lch sound pressure and the Rch sound pressure in the case where the English speaker starts the utterance and then the Japanese speaker starts speaking before the utterance of the English speaker is finished. The noise sound pressure corresponds to the sound pressure attributed to the utterance of the Japanese speaker. As described above, the suppression unit 15 suppresses the utterance start direction sound pressure, which is one of the Lch sound pressure and the Rch sound pressure being larger at the time point of detecting the utterance start, when the utterance start direction sound pressure falls below the non-utterance start direction sound pressure, which is the other one of the Lch sound pressure and the Rch sound pressure being smaller at the time point of detecting the utterance start.

At the time point of detecting the utterance start, the English speaker is speaking while the Japanese speaker is not speaking. Hence, the Lch sound pressure is larger than the Rch sound pressure. Accordingly, the Lch sound pressure represents the utterance start direction sound pressure and the Rch sound pressure represents the non-utterance start direction sound pressure. Thereafter, the suppression unit 15 starts the suppression processing as the Japanese speaker starts the utterance and the utterance start direction sound pressure becomes smaller than the non-utterance start direction sound pressure at a time point T1 after a lapse of a predetermined period from the detection of the utterance of the English speaker. For example, the suppression unit 15 performs the suppression by subtracting the predetermined value β from the Lch sound pressure for each frame, and outputs the sound pressure after the subtraction to the utterance detection unit 16. The utterance detection unit 16 detects the utterance end based on the suppressed utterance start direction sound pressure.

In the example illustrated in FIG. 7, the Lch sound pressure after the suppression falls below the utterance detection threshold at the timing of the ending of the utterance of the English speaker. Accordingly, the utterance detection unit 16 may detect the utterance end at a correct timing.

Next, a first example of a method of calculating the suppression amount β will be described. The sound pressure difference D at the time of an operation is assumed to be $P_L - P_R$ as described above. Of the Lch sound pressure $P_L$, a sound pressure attributable to the speech is defined as $S_L$ and a sound pressure attributable to the noise is defined as $N_L$. Of the Rch sound pressure $P_R$, a sound pressure attributable to the speech is defined as $S_R$ and a sound pressure attributable to the noise is defined as $N_R$. The Lch sound pressure $P_L$ and the Rch sound pressure $P_R$ are expressed by the following formulae (4) and (5):

$$P_L = S_L + N_L \qquad (4); \text{ and}$$

$$P_R = S_R + N_R \qquad (5).$$

The values $N_L$ and $N_R$ are noise sound pressure values estimated by the noise sound pressure estimation units 22 in the first utterance detection unit 16-1 and the second utterance detection unit 16-2, respectively.

A sound pressure difference $D_S$ between the sound pressures attributable to the speeches at the time of the operation is expressed by the following formula (6):

$$D_S = S_L - S_R = (P_L - N_L) - (P_R - N_R) \qquad (6).$$

Figure 8:
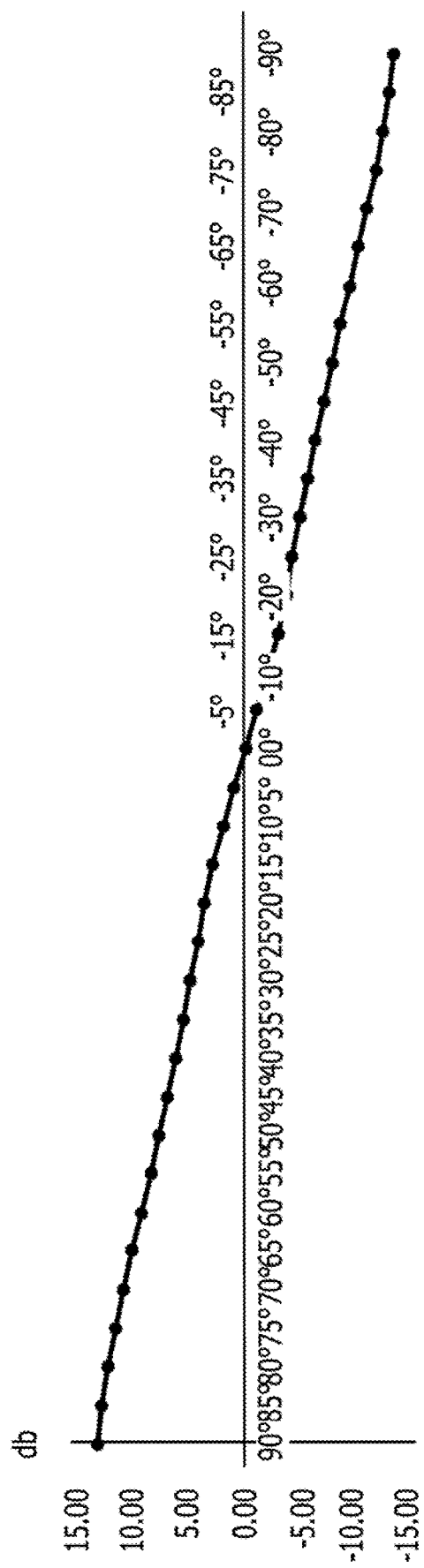
FIG. 8 is a graph illustrating an example of a relation between a direction of a sound source and a sound pressure difference in a preliminary test.

FIG. 8 is a graph illustrating an example of a relation between the direction of the sound source and the sound pressure difference in a preliminary test. Specifically, FIG. 8 plots the sound pressure difference depending on various directions in a preliminary test conducted in advance, in the case where a test sound is played from a sound source while shifting the direction of the sound source relative to the terminal little by little in a quiet environment where background noise is negligible. The sound pressure from the sound source is set to be a sound pressure sufficiently larger than that of the background noise (such as a sound pressure larger by 20 dB than that of the background noise or a sound pressure 100 times as large as that of the background noise). A distance from a microphone to the sound source is set to an estimated distance at the time of use (such as 80 cm). One sound source is used in the preliminary test.

When the direction of the sound source is θ, the Lch sound pressure in the preliminary test will be defined as $P_L(\theta)$ while the Rch sound pressure in the preliminary test will be defined as $P_R(\theta)$. In the preliminary test, an average value of the noise sound pressure on the Lch side during a predetermined period will be defined as $N_{LA}$ and an average value of the noise sound pressure on the Rch side during the predetermined period will be defined as $N_{RA}$. A sound pressure difference $D_S(\theta)$ between the sound pressures attributed to the speeches in the preliminary test will be expressed by the following formula. Note that the sound pressure difference plotted in the graph in FIG. 8 represents the pressure difference $D_S(\theta)$ calculated by the following formula (7):

$$D_S(\theta) = S_L(\theta) - S_R(\theta) = (P_L(\theta) - N_{LA}) - (P_R(\theta) - N_{RA}) \qquad (7).$$

Assuming that there is one sound source and the sound source is present in the Rch direction, the Lch sound pressure $P_L$ may be regarded as a sum of a sound pressure of the sound that detours to the Lch side and the noise sound pressure $N_L$. When the Lch sound pressure is the utterance start direction sound pressure which is the larger sound pressure at the time point of detection of the utterance start, the suppression amount β may be expressed by the following formula (8) while using the sound pressure difference $D_S(\theta)$ in the preliminary test:

$$\beta = S_R + D_S(\theta) = P_R - N_R + D_S(\theta) \qquad (8).$$

The value β indicated in the formula (8) represents an estimated amount of the sound pressure based on the sound that is inputted in the Rch direction, which is the different direction from the direction of the sound source at the time point of the detection of the utterance start, to the Lch having the directionality in the direction of the sound source at the time point of the detection of the utterance start. In other words, the value β indicated in the formula (8) is an estimated amount of the sound pressure of the sound that detours from the direction that the Rch has the directionality to the direction that the Lch has the directionality. The suppression unit 15 performs the suppression processing by subtracting the value β calculated with the foregoing formula (8) from the value $P_L$.

In the above description, the sound pressures attributable to the noise at the time of the operation are defined as $N_R$ and $N_L$ while the average values of the noise sound pressures in the preliminary test are defined as $N_{LA}$ and $N_{RA}$. However, the values $N_R$, $N_L$, $N_{LA}$, and $N_{RA}$ may be disregarded in a sufficiently quiet environment (an environment where the SNR is sufficiently high). For example, in the case where SNR≥20 dB, an influence of the noise on the sound pressure attributable to the utterance is presumably around 1% at most, and such a small influence may be ignored. In this case, the suppression unit 15 performs the calculation based on the above-described formulae while setting each of the values $N_R$, $N_L$, $N_{LA}$, and $N_{RA}$ to 0.

Figure 9:
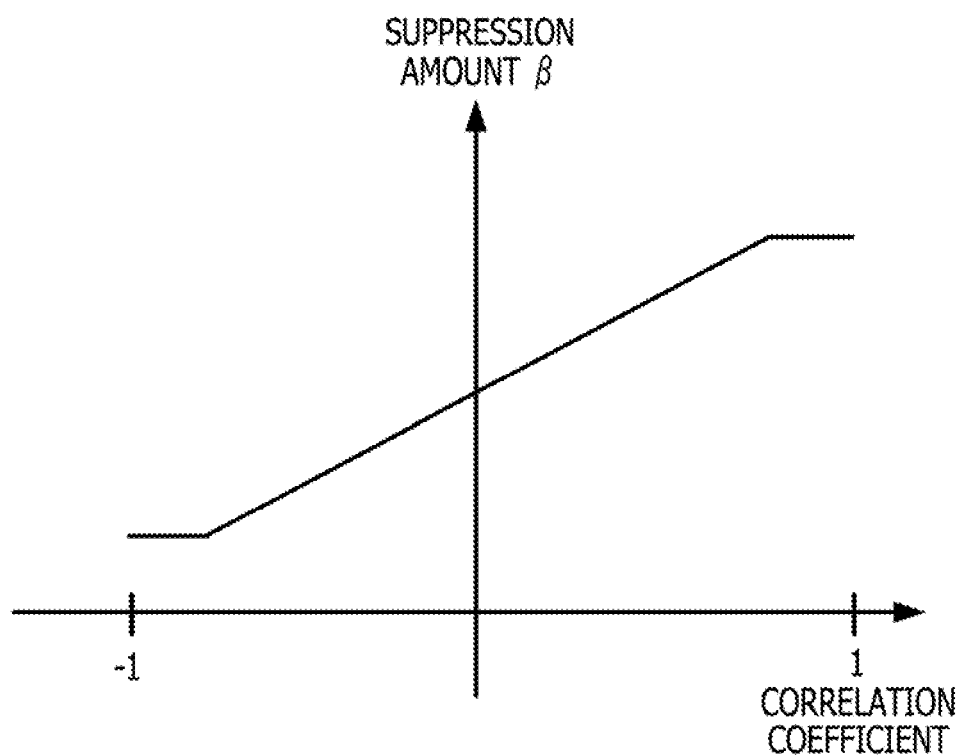
FIG. 9 is a graph illustrating an example of a relation between a suppression amount β in a frame being processed and a correlation coefficient representing a degree of similarity of an Lch frequency characteristic of to an Rch frequency characteristic.

Next, a second example of the method of calculating the suppression amount β will be described. FIG. 9 is a graph illustrating an example of a relation between the suppression amount β in a frame being processed and a correlation coefficient representing a degree of similarity of a frequency characteristic of the Lch to a frequency characteristic of the Rch. As plotted in FIG. 9, a larger value of the suppression amount β is set as the correlation coefficient between the frequency characteristics of the Lch and the Rch is larger.

A correlation coefficient C is expressed by the following formula (9). In the formula (9), Fl(f) denotes a power spectrum of a frequency band f of the Lch while Fr(f) denotes a power spectrum of the frequency band f of the Rch. In the meantime, f is assumed to be in a range from 0 to F−1 where F is a frame analysis window width divided by 2.

$$C = \frac{\sum_f (Fl(f) - \overline{Fl})(Fr(f) - \overline{Fr})}{\sqrt{\sum_f (Fl(f) - \overline{Fl})^2 \sum_f (Fr(f) - \overline{Fr})^2}} \qquad (9)$$

A small correlation coefficient presumably represents a situation in which the speakers in both of the Lch and Rch directions are speaking. In other words, it is likely that the speaker who started the utterance earlier has not finished the speech yet. Accordingly, the suppression amount is set to a low value so as to avoid excessive suppression. On the other hand, a large correlation coefficient presumably represents a situation in which one of the speakers is speaking. In this case, it is likely that the speaker who started the utterance earlier has finished the speech. Accordingly, the utterance detection apparatus 6 increases the suppression amount so as to facilitate detection of the utterance end.

As an index of the degree of similarity between the two channels, any of inner product I expressed by the following formula (10) and covariance S expressed by the following formula (11) may be used instead of the correlation coefficient of the frequency characteristics.

$$I = \sum_f Fl(f) Fr(f) \tag{10}$$

$$S = \sum_f (Fl(f) - \overline{Fl})(Fr(f) - \overline{Fr}) \tag{11}$$

Figure 10:
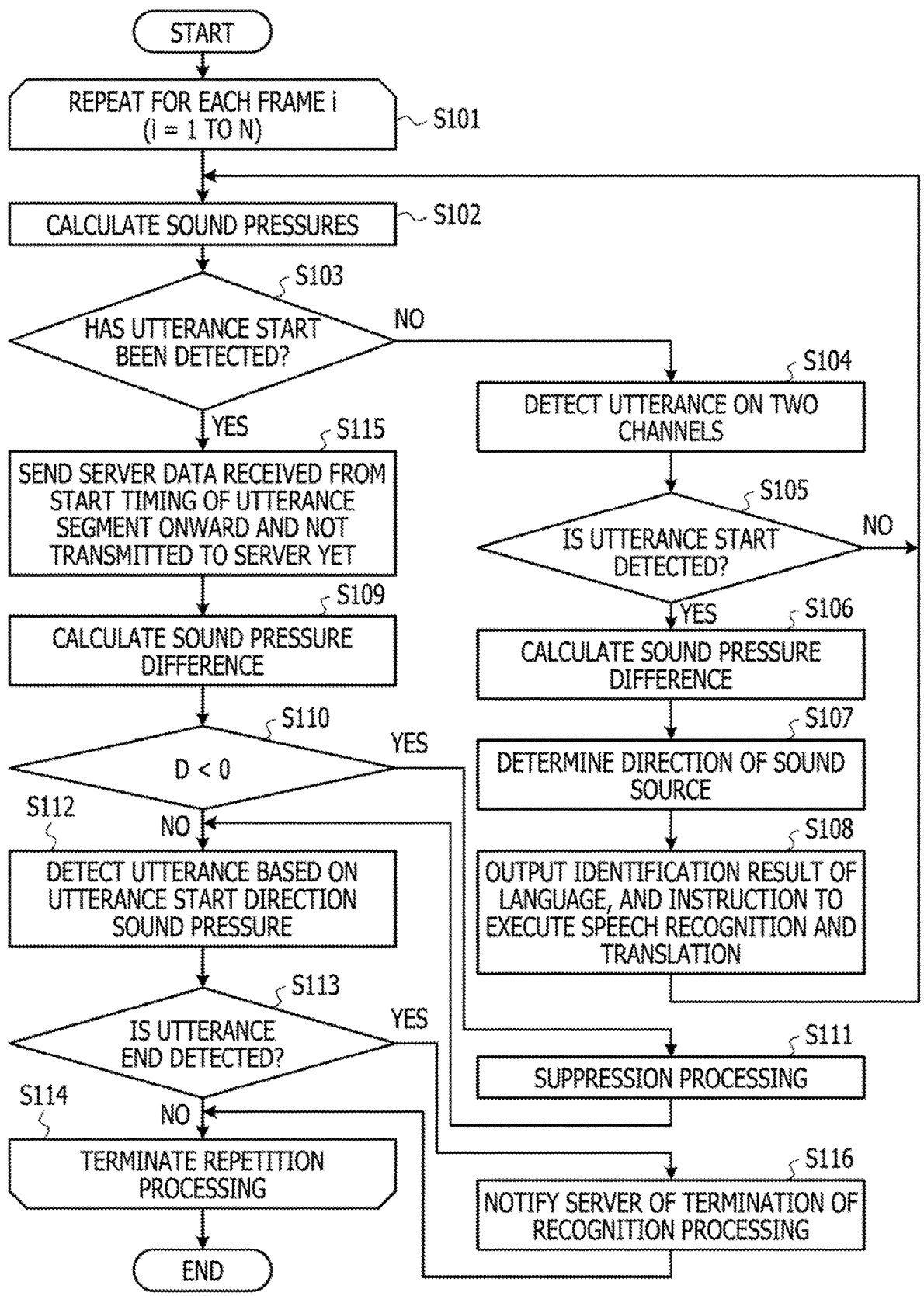
FIG. 10 is a flowchart illustrating an example of processing performed by an utterance detection apparatus according to the embodiment.

FIG. 10 is a flowchart illustrating an example of processing performed by the utterance detection apparatus 6 according to the embodiment. The utterance detection apparatus 6 starts repetition processing for each frame on the first audio data acquired from the first microphone 1 and on the second audio data acquired from the second microphone 2 (step S101). Defining a frame of a processing target as a frame i, the repetition processing is performed until the value i is incremented from 1 to N (where N represents the number of frames corresponding to a maximum input time length, which may be replaced by the number of frames corresponding to an input data length in a case of inputting files).

The sound pressure calculation unit 12 calculates the sound pressure (the Lch sound pressure) based on the first audio data and the sound pressure (the Rch sound pressure) based on the second audio data, and outputs the calculated sound pressures to the sound pressure difference calculation unit 13 and to the suppression unit 15 (step S102). When the utterance start has not been detected at the frame i-1 or earlier (NO in step S103), the utterance detection unit 16 performs the utterance detection (detection of the utterance start) on each of the channels by using the sound pressures of the two channels (the Lch sound pressure and the Rch sound pressure) outputted from the sound pressure calculation unit 12 (step S104).

When the utterance detection unit 16 does not detect any utterance start in S104 (NO in step S105), the processing proceeds to step S102 to perform the processing on the next frame.

When the utterance detection unit 16 detects the utterance start in S104 (YES in step S105), the sound pressure difference calculation unit 13 calculates the sound pressure difference and outputs the sound pressure difference to the determination unit 14 (step S106). The sound pressure difference calculation unit 13 outputs the value $P_L - P_R$ as the sound pressure difference D, for example. In the meantime, the utterance detection unit 16 outputs information on the start timing of the utterance segment to the output unit 17.

The determination unit 14 determines the directions of the sound sources of the first audio data and the second audio data based on the sound pressure difference (step S107). When the sound pressure difference $D = P_L - P_R$ holds true, for example, the determination unit 14 determines that the direction of the sound source is the direction corresponding to the directionality of the first microphone 1 (the direction in which the English speaker is present in FIG. 1) when D>0 holds true. The determination unit 14 determines that the direction of the sound source is the direction corresponding to the directionality of the second microphone 2 (the direction in which the Japanese speaker is present in FIG. 1) when D<0 holds true.

The determination unit 14 identifies the language based on the direction of the sound source and outputs the identification result of the language and the instruction to execute the speech recognition and the translation corresponding to the identified language to the server 4 through the output unit 17 (step S108). Thereafter, the processing proceeds to step S102 to perform the processing on the next frame.

In the case of YES in step S103, the output unit 17 transmits a portion of the audio data stored in the sound storage unit, which is the data received from the utterance detection unit 16 from the start timing of the utterance segment onward and yet to be transmitted to the server, to the server 4 as data targeted for the speech recognition (step S115).

The sound pressure difference calculation unit 13 calculates the sound pressure difference (step S109). When the direction of the sound source determined in step S107 is the direction in accordance with the directionality of the first microphone 1 (the Lch), the sound pressure difference calculation unit 13 calculates the $P_L - P_R$ as the sound pressure difference D and outputs the sound pressure difference D to the suppression unit 15. When the direction of the sound source determined in step S107 is the direction in accordance with the directionality of the second microphone 2 (the Rch), the sound pressure difference calculation unit 13 calculates the $P_R - P_L$ as the sound pressure difference D and outputs the sound pressure difference D to the suppression unit 15.

The suppression unit 15 determines whether or not D<0 holds true by using the sound pressure difference D calculated in step S109, thereby determining whether or not the suppression is to be performed (step S110). When D<0 holds true (YES in step S110), the suppression unit 15 performs the suppression processing (step S111). The suppression unit 15 outputs the value obtained by subtracting the predetermined suppression amount β from the utterance start direction sound pressure, for example, to the utterance detection unit 16. When the direction of the sound source is the direction in accordance with the directionality of the first microphone 1 (the Lch), the suppression unit 15 calculates $P_L \rightarrow P_L - \beta$, for example. When the direction of the sound source is the direction in accordance with the directionality of the second microphone 2 (the Rch), the suppression unit 15 calculates $P_R \rightarrow P_R - \beta$.

In the case of using the sound pressure calculated in step S109, D>0 holds true immediately after the utterance start. However, there is a possibility that D<0 holds true when the speaker who starts the utterance is different from the speaker who started the utterance earlier. In this case, the suppression unit 15 performs the suppression processing (steps S110 and S111). Specifically, when the utterance start direction sound pressure which is one of the Lch sound pressure and the Rch sound pressure being larger at the time point of the utterance start falls below the non-utterance start direction sound pressure which is one of the Lch sound pressure and the Rch sound pressure being smaller at the time point of the utterance start, the suppression unit 15 suppresses the utterance start direction sound pressure.

In the case of NO in step S110 or after the processing in step S111, the utterance detection unit 16 performs the utterance detection (the detection of the utterance end) based on the utterance start direction sound pressure which is suppressed or the utterance start direction sound pressure which is not suppressed (step S112). For example, in the case of NO in step S110, the utterance detection unit 16 performs the utterance detection based on the utterance start direction sound pressure (the sound pressure which is not suppressed) outputted from the sound pressure calculation unit 12. In the case after the processing in step S111, the utterance detection unit 16 performs the utterance detection based on the utterance start direction sound pressure suppressed by the suppression unit 15.

When the utterance detection unit 16 does not detect the utterance end (NO in step S113), the utterance detection apparatus 6 terminates the processing on the frame i and performs the processing on the next frame. When the processing concerning all the frames of the inputted sounds is completed, the utterance detection apparatus 6 terminates the repetition processing (step S114) and concludes the processing. When the utterance detection unit 16 detects the utterance end (YES in step S113), the utterance detection apparatus 6 notifies the server 4 of termination of the speech recognition through the output unit 17 (step S116), and concludes the processing.

As described above, when the speaker starts the utterance after the start of the utterance by the earlier speaker, the utterance detection apparatus 6 may restrain a delay in detecting the utterance end of the speaker who started the utterance first by suppressing the utterance start direction sound pressure, thereby improving detection accuracy of the utterance end.

Figure 11:
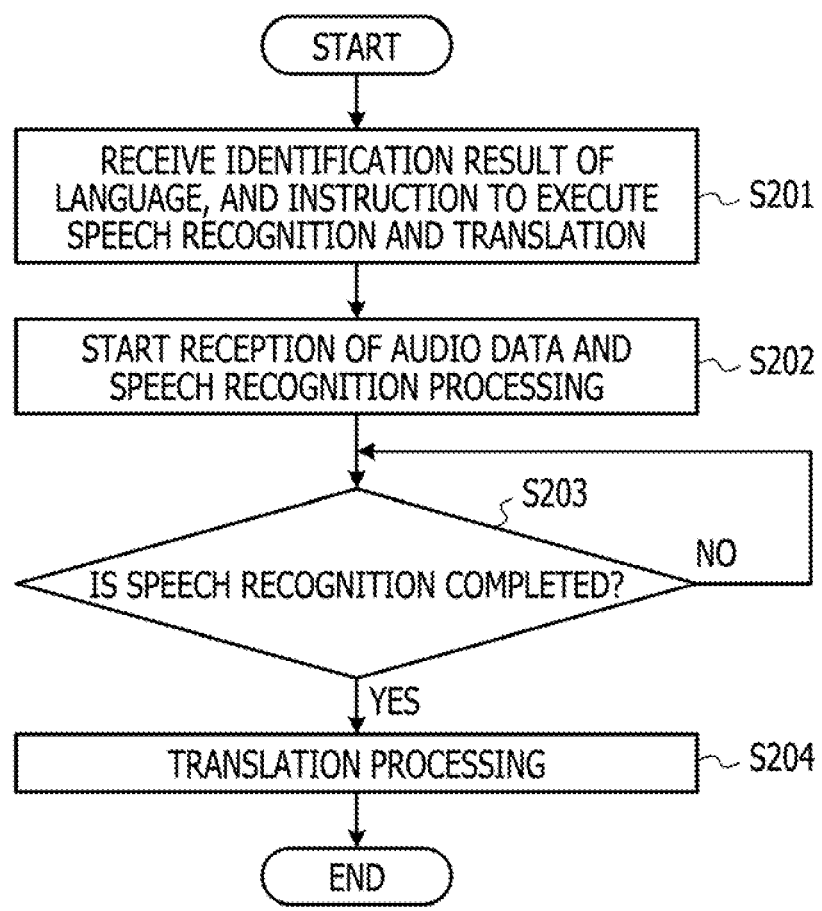
FIG. 11 is a flowchart illustrating an example of processing performed by a server according to the embodiment.

FIG. 11 is a flowchart illustrating an example of processing performed by the server 4 according to the embodiment. The server 4 receives from the output unit 17 the data on the language to be used in the speech recognition and the language pair to be used in the translation, collectively as the identification result of the language which is based on the direction of the sound source (step S201).

The speech recognition unit 18 sequentially receives the audio data of the utterance segment from the utterance detection apparatus 6, and starts the speech recognition processing on the audio data of the utterance segment by using the language received in step S201 (step S202). After the speech recognition is started, the speech recognition unit 18 performs the reception of the audio data and the speech recognition processing in parallel.

When the speech recognition is not completed (NO in step S203), the translation unit 19 stands by until the speech recognition is completed. When the speech recognition is completed (YES in step S203), the translation unit 19 translates the result of the speech recognition processing into the designated language based on the language pair received in step S201 (step S204).

As described above, the server 4 executes the speech recognition and the translation of the language identified based on the direction of the sound source. Thus, the server 4 may execute the speech recognition and the translation by using the appropriate language.

Figure 12:
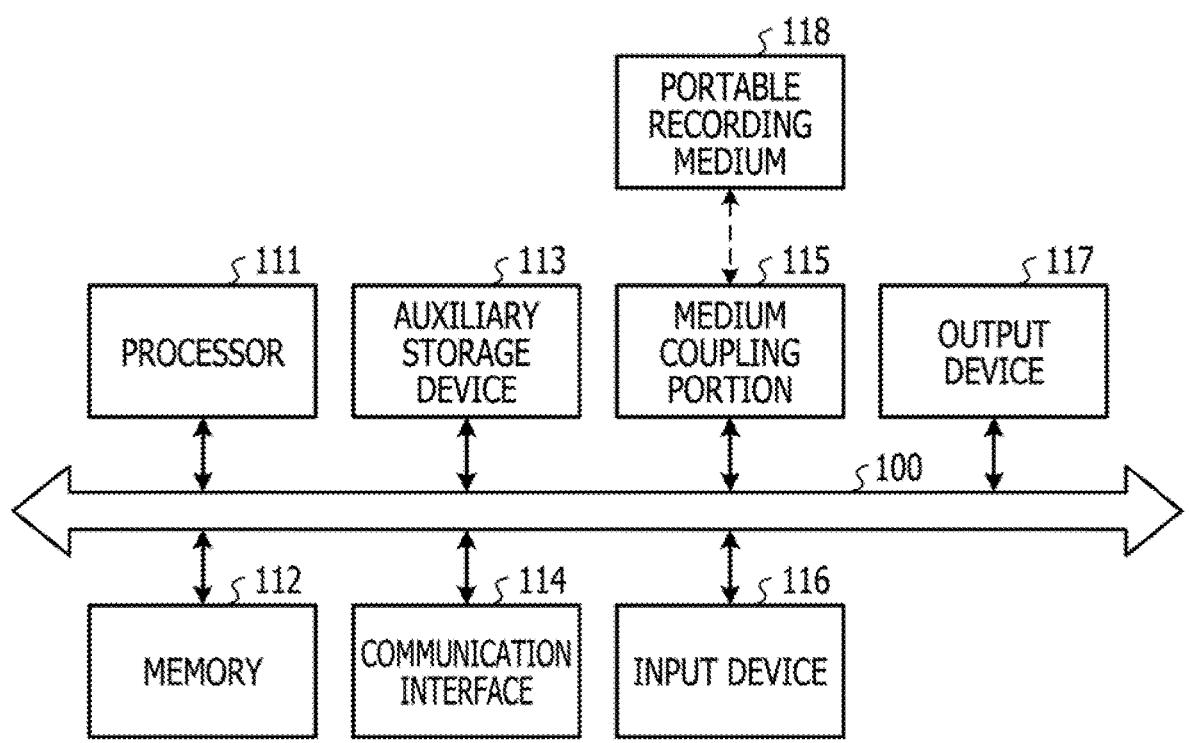
FIG. 12 is a diagram illustrating an example of a hardware configuration of the utterance detection apparatus.

An example of a hardware configuration of the utterance detection apparatus 6 will be described. FIG. 12 is a diagram illustrating an example of a hardware configuration of the utterance detection apparatus 6. As illustrated in the example of FIG. 12, in the utterance detection apparatus 6, a processor 111, a memory 112, an auxiliary storage device 113, a communication interface 114, a medium coupling portion 115, an input device 116, and an output device 117 are coupled to a bus 100.

The processor 111 executes a program loaded to the memory 112. The utterance detection program for performing the processing according to the embodiment may be used as the program to be executed.

The memory 112 is, for example, a random-access memory (RAM). The auxiliary storage device 113 is a storage device that stores various kinds of information. For example, a hard disk drive, a semiconductor memory, or the like may be used as the auxiliary storage device 113. The utterance detection program for performing the processing according to the embodiment may be stored in the auxiliary storage device 113.

The communication interface 114 is coupled to a communication network such as a local area network (LAN) or a wide area network (WAN), and performs data conversion and the like involved in communication.

The medium coupling portion 115 is an interface to which a portable recording medium 118 may be coupled. An optical disc (for example, a compact disc (CD) or a digital versatile disc (DVD)), a semiconductor memory, or the like may be used as the portable recording medium 118. The utterance detection program for performing the processing according to the embodiment may be recorded on the portable recording medium 118.

The input device 116 is, for example, a keyboard, a pointing device, or the like, and accepts input of instructions and information from a user.

The output device 117 is, for example, a display device, a printer, a speaker, or the like, and outputs an inquiry or an instruction to a user, a processing result, and so on.

The sound storage unit 11 illustrated in FIG. 5 may be implemented by the memory 112, the auxiliary storage device 113, the portable recording medium 118, or the like.

The sound pressure calculation unit 12, the sound pressure difference calculation unit 13, the determination unit 14, the suppression unit 15, and the utterance detection unit 16 that are illustrated in FIG. 5 may be enabled by causing the processor 111 to execute the utterance detection program loaded in the memory 112.

The memory 112, the auxiliary storage device 113, and the portable recording medium 118 are non-transitory computer-readable tangible storage media and are not temporary media such as signal carriers.

<Others>

Embodiments of the present disclosure are not limited to the embodiment described above, and various modifications, additions, and omissions may be made without departing from the gist of the embodiments of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing an utterance detection program which causes a processor to perform processing, the processing comprising:

detecting an utterance start of a target sound source by using a first sound pressure and a second sound pressure, the first sound pressure being a sound pressure based on first audio data acquired from a first microphone, the second sound pressure being a sound pressure based on second audio data acquired from a second microphone;

suppressing an utterance start direction sound pressure in response to detecting that the utterance start direction sound pressure falls below a non-utterance start direction sound pressure, the utterance start direction sound pressure being a sound pressure selected from among the first sound pressure and the second sound pressure and being the larger of the first sound pressure and the second sound pressure at a time point of detecting the utterance start, the non-utterance start direction sound pressure being a sound pressure selected from among the first sound pressure and the second sound pressure and being the smaller of the first sound pressure and the second sound pressure at the time point of detecting the utterance start; and detecting an utterance end of the target sound source by using the suppressed utterance start direction sound pressure.

2. The non-transitory computer-readable storage medium according to claim 1, wherein
one of the first microphone and the second microphone has directionality in a direction of the target sound source at the time point of detecting the utterance start,
a suppression amount to the utterance start direction sound pressure is an estimated amount of a sound pressure based on a sound inputted to one of the first microphone and the second microphone, the sound being inputted in a direction different from the direction of the target sound source at the time point of detecting the utterance start.

3. The non-transitory computer-readable storage medium according to claim 1, wherein
a suppression amount to the utterance start direction sound pressure is set to a larger value as a degree of similarity of the first audio data to the second audio data becomes larger.

4. The non-transitory computer-readable storage medium according to claim 3, wherein
the degree of similarity employs any one of a correlation coefficient between frequency characteristics of the first audio data and the second audio data, inner product of the first audio data and the second audio data, and covariance of the first audio data and the second audio data.

5. The non-transitory computer-readable storage medium according to claim 1, wherein the program further causes the computer to execute processing comprising:
determining a direction of a sound source of each of the first audio data and the second audio data based on a sound pressure difference between the first sound pressure and the second sound pressure;
identifying a language based on the directions of the sound sources; and
outputting an instruction to execute translation based on the identified language.

6. An utterance detection method of causing a computer to execute processing comprising:
detecting an utterance start of a target sound source by using a first sound pressure and a second sound pressure, the first sound pressure being a sound pressure based on first audio data acquired from a first microphone, the second sound pressure being a sound pressure based on second audio data acquired from a second microphone;

suppressing an utterance start direction sound pressure in response to detecting that the utterance start direction sound pressure falls below a non-utterance start direction sound pressure, the utterance start direction sound pressure being a sound pressure selected from among the first sound pressure and the second sound pressure and being the larger of the first sound pressure and the second sound pressure at a time point of detecting the utterance start, the non-utterance start direction sound pressure being a sound pressure selected from among the first sound pressure and the second sound pressure and being the smaller of the first sound pressure and the second sound pressure at the time point of detecting the utterance start; and detecting an utterance end of the target sound source by using the suppressed utterance start direction sound pressure.

7. The utterance detection method according to claim 6, wherein
one of the first microphone and the second microphone has directionality in a direction of the target sound source at the time point of detecting the utterance start,
a suppression amount to the utterance start direction sound pressure is an estimated amount of a sound pressure based on a sound inputted to one of the first microphone and the second microphone, the sound being inputted in a direction different from the direction of the target sound source at the time point of detecting the utterance start.

8. The utterance detection method according to claim 6, wherein
a suppression amount to the utterance start direction sound pressure is set to a larger value as a degree of similarity of the first audio data to the second audio data becomes larger.

9. The utterance detection method according to claim 8, wherein
the degree of similarity employs any one of a correlation coefficient between frequency characteristics of the first audio data and the second audio data, inner product of the first audio data and the second audio data, and covariance of the first audio data and the second audio data.

10. The utterance detection method according to claim 6, wherein the program further causes the computer to execute processing comprising:
determining a direction of a sound source of each of the first audio data and the second audio data based on a sound pressure difference between the first sound pressure and the second sound pressure;
identifying a language based on the directions of the sound sources; and
outputting an instruction to execute translation based on the identified language.

11. An utterance detection apparatus comprising:
a memory; and
a processor coupled to the memory, the processor being configured to
detect an utterance start of a target sound source by using a first sound pressure and a second sound pressure, the first sound pressure being a sound pressure based on first audio data acquired from a first microphone, the second sound pressure being a sound pressure based on second audio data acquired from a second microphone, suppress an utterance start direction sound pressure in response to detecting that the utterance start direction sound pressure falls below a non-utterance start direction sound pressure, the utterance start direction sound pressure being a sound pressure selected from among the first sound pressure and the second sound pressure and being the larger of the first sound pressure and the second sound pressure at a time point of detecting the utterance start, the non-utterance start direction sound pressure being a sound pressure selected from among the first sound pressure and the second sound pressure and being the smaller of the first sound pressure and the second sound pressure at the time point of detecting the utterance start, and detect an utterance end of the target sound source by using the suppressed utterance start direction sound pressure.

12. The utterance detection apparatus according to claim 11, wherein one of the first microphone and the second microphone has directionality in a direction of the target sound source at the time point of detecting the utterance start, a suppression amount to the utterance start direction sound pressure is an estimated amount of a sound pressure based on a sound inputted to one of the first microphone and the second microphone, the sound being inputted in a direction different from the direction of the target sound source at the time point of detecting the utterance start.

13. The utterance detection apparatus according to claim 11, wherein a suppression amount to the utterance start direction sound pressure is set to a larger value as a degree of similarity of the first audio data to the second audio data becomes larger.

14. The utterance detection apparatus according to claim 13, wherein the degree of similarity employs any one of a correlation coefficient between frequency characteristics of the first audio data and the second audio data, inner product of the first audio data and the second audio data, and covariance of the first audio data and the second audio data.

15. The utterance detection apparatus according to claim 11, wherein the program further causes the computer to execute processing comprising:

determining a direction of a sound source of each of the first audio data and the second audio data based on a sound pressure difference between the first sound pressure and the second sound pressure;

identifying a language based on the directions of the sound sources; and outputting an instruction to execute translation based on the identified language.

* * * * *